May 31, 1927.
H. SWARTZ ET AL
1,630,546
STEAM GENERATOR
Filed April 12, 1926
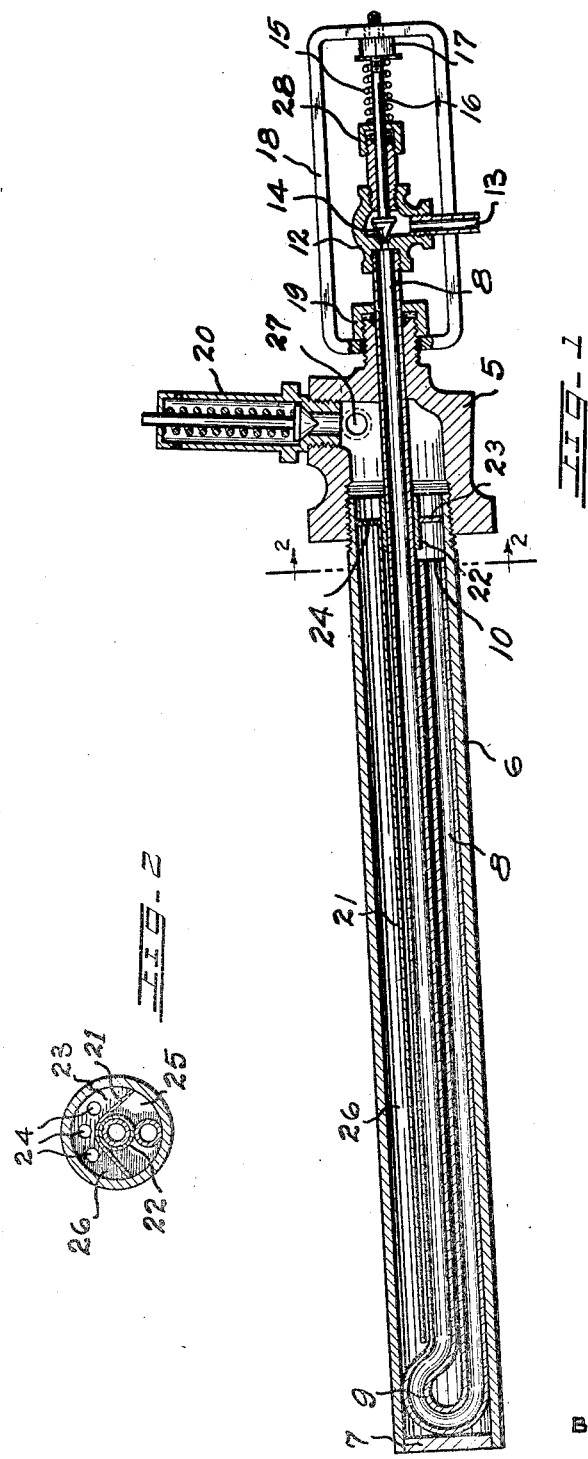
INVENTOR
Hugh Swartz.
Paul C. Mulligan.
BY Frank Warren
ATTORNEY Patented May 31, 1927.

1,630,546

UNITED STATES PATENT OFFICE.

HUGH SWARTZ AND PAUL C. MULLIGAN, OF SEATTLE, WASHINGTON, ASSIGNORS, BY DIRECT AND MESNE ASSIGNMENTS, TO DUAL OIL BURNER COMPANY, A CORPORATION.

STEAM GENERATOR.

Application filed April 12, 1926. Serial No. 101,331.

Our invention relates to improvements in steam generating means commonly known as a flash boiler and the object of our invention is to provide a steam generating unit for producing steam for many services now supplied by more expensive, bulky, and less easily controlled boilers, such as are used for tire vulcanizing, cleaning, water heating, laboratory use, heavy oil atomization and for cooking purposes and is more especially adapted for use to supply pressure for operating small oil burners without the need of mechanical means such as blowers and pumps that are comonly used for such purposes.

A further object is to provide a steam generating device embodying thermostatic means for regulating the flow of water within said generating means.

Another object is to provide a steam generating device embodying means to deflect and separate the generated steam so as to superheat the same.

Another object is to provide a simple, compact and unexplosive steam generating unit for continuously generating steam at any desired pressure and which is capable of automatic operation by the application of heat and the admission of water from a source of supply.

Another object is to provide a flash boiler wherein the water is caused to flow by gravity upon the heated portion thereof whereby the water is converted into steam before it arrives at the end of said heated portions.

These and other objects will appear as our invention is more fully hereinafter illustrated in the accompanying drawings, described in the following specification and finally pointed out in the appended claims.

We accomplish these objects by the device illustrated in the accompanying drawings, wherein—

Figure 1 is a sectional view of our invention.

Fig. 2 is a view in section taken on line 2, 2 of Fig. 1 showing the means for deflecting and separating the generated steam.

Referring to the drawings, throughout which like reference numerals indicate like parts, the numeral 5 designates a manifold casting to which is securely fastened a tubular casing 6 closed at its lower end by a plug 7. A tube or conduit 8 is disposed within the casing 6 and is arranged to form a return bend so that the end 10 falls within the upper end of said casing, the other end passing through the manifold and being slidably mounted therein and terminating in a valve housing 12. Water from a source not shown may be admitted into the valve housing 12 by means of the conduit 13 and the valve 14 which controls the flow of said water. A spring 15 is arranged to urge the valve toward an open position, as shown in Fig. 1, by means of the valve stem 16 and the adjusting nut 17.

A yoke 18 is held in position on the manifold 5 by means of the packing gland 19 and is provided with an opening at the opposite end to allow the valve stem 16 to pass therethrough. The said yoke 18 is held against the said gland 19 by the action of the spring 15 bearing against the nut 17 which in turn bears against the said yoke 18. A safety valve 20 is positioned on the manifold 5 to provide a relief for steam over and above a predetermined pressure.

A system of baffles is arranged in the casing 6 which consists of a deflector 21 being attached to a sleeve 22 to which is fastened a disc 23 provided with steam outlet holes 24. The deflector 21 separates the interior of the casing 6 into substantially two compartments 25 and 26. A steam outlet 27 is provided in the manifold 5 for the discharge of the steam as generated. The operation of our device is as follows: Heat from a suitable source is applied directly to the casing 6 causing it to expand and thereby increasing its length in a ratio consistent with the heat applied and the characteristic expansion coefficient of the metal of which the casing is made.

It will be noted from the accompanying drawings that the spring 15 urges the tube 8 down against the plug 7 of the casing 6 by acting against the packing gland 28 which conveys the pressure against said tube by means of the valve housing 12. The reacting pressure of the spring 15 is conveyed to the manifold 5 by reason of the nut 17 bearing against the yoke 18 which is directly connected to the manifold and held in position by the gland nut 19.

The spring 15 acting in the aforesaid manner permits the elongation of the casing to cause corresponding movement on the tube 8 in a degree equal to the total amount of elongation of said casing. The movement of the tube, due to expansion or contraction of the casing 6 will result in the opening or closing of the valve 14.

Water from a source, not shown, is admitted into the valve housing 12 by means of the conduit 13 and since the valve housing is secured to the tube 8 the water is permitted to enter said tube by the operation of the valve 14.

After the casing has been heated and expanded sufficiently to open the valve 14 water enters the tube 8 and passes down into the curved portion 9 and thence flows out the end 10 into the upper end of the lower compartment 25 of the casing and since the flow of water depends upon the action of gravity the casing is positioned on a slope in an inclined position so that the lower plugged end is lower than the manifold 5 thereby allowing the water as it leaves the end 10 of the tube to pass downwardly by gravity in the casing and become directly exposed to the heated surface of the casing. This action causes the immediate generation of steam in an amount relative to the temperature of the casing and the quantity of water flowing therein. The steam so generated is caused to rise and passes back to the lower end of the casing by reason of the deflector 21 thence into compartment 26 out through the holes 24 in the disc 23 into the manifold 5 and out through the openings 27 ready for use. Any moisture that may remain in the steam generated as it flows down the heated surface of the casing is completely removed by reason of its passing through the compartment 26 and being exposed further to the heated surface of the casing thereby superheating the steam.

The water, as it passes through the tube 8 is heated to a more or less degree but the temperature, especially the upper portion, of the tube never reaches the same point as does the temperature of the casing so that there is always a difference in the amount of elongation which is sufficient to open the valve 14. It is obvious that the cool water entering the valve casing 12 will prevent that portion of the tube between the valve casing 12 and the curved portion 9 from becoming highly heated.

Should the heat that is applied to the casing be removed for any cause the consequent cooling of the same shortens its length and thereby closes the valve 14 by reason of the upward movement of the tube 8 and the action of the yoke 18 in preventing the movement of the valve stem 16.

It will be obvious from the drawings and the action of the tube as described that said tube is slidably mounted within the manifold and that to prevent leakage of steam pressure where said tube extends out of said manifold we provide a suitable stuffing box or packing gland 19 which permits a sliding movement of the tube without the loss of generated pressure.

It will be obvious that our device is non-explosive for the reason that no considerable volume of hot water is contained therein during the operation of generating steam.

It will also be obvious that the control is effective because the heating surface of the casing is normally hot and expanded and the feed conduit remains substantially cool and contracted, the feed conduit acting as a constant temperature thrust rod extending from the extreme inner end of the casing and transmitting the action of the expanding casing to the exterior control valve in a direct manner.

Our steam generating means may be readily adaptable as the vaporizing element of any combination of heating surfaces such as a tubular coil or straight tubes in which heat may be absorbed by fluid in its passage from the source of supply to the inlet valve on the boiler. If our device is used for supplying steam to be used in radiators or other suitable condensing surfaces located above the device, then the condensed steam will flow by gravity back through the control valve thereby providing a constant supply of steam for an ordinary heating system.

From the foregoing description and accompanying drawings it will be obvious that modifications will occur and changes may be made without departing from the spirit and scope of our invention.

What we claim is:

1. In a steam generator of the class described, an outer casing having a closed outer end, a manifold fitting on the inner end of said casing, a conduit extending through said manifold fitting and into said casing, thence bent double near the outer end of said casing and extending back to a point near the inner end of said casing, the inner end of the conduit being open, a partition in said casing near the inner end, a deflector member extending lengthwise of said casing from said partition to a point near the opposite end of said casing and dividing said casing into an upper and lower compartment, said partition member having openings at the end of said upper compartment for the passage of steam and said manifold fitting having a steam outlet port, and means for supplying liquid to the inlet end of said conduit.

2. In a flash boiler, an outer casing arranged to be heated in an inclined position and having the lower end closed, a manifold on the upper end of said casing, an inlet conduit extending from said manifold into said casing and having a doubled portion extending backwardly toward the upper end of said casing and being open for the discharge of fluid, a partition in said casing near the inner end, a deflector member extending lengthwise of said casing from said partition to a point near the opposite end of said casing and dividing said casing into an upper and lower passageway, said portion having openings at the end of said upper passageway for the passage of steam and said manifold having a steam outlet port, and means for supplying liquid to the inlet end of said conduit.

In witness whereof, we hereunto subscribe our names this 3rd day of April A. D. 1926.

HUGH SWARTZ.
PAUL C. MULLIGAN.